United States Patent
Jourdan

(10) Patent No.: US 8,700,346 B2
(45) Date of Patent: Apr. 15, 2014

(54) DEVICE FOR MEASURING AND PROCESSING A HIGH DYNAMIC INPUT SIGNAL, AND CORRESPONDING LEAK DETECTOR AND MEASURING AND PROCESSING METHOD

(75) Inventor: Pascal Jourdan, Annecy (FR)

(73) Assignee: Adixen Vacuum Products, Annecy (FR)

( * ) Notice: Subject to any disclaimer, the term of this patent is extended or adjusted under 35 U.S.C. 154(b) by 404 days.

(21) Appl. No.: 13/144,082

(22) PCT Filed: Jan. 11, 2010

(86) PCT No.: PCT/FR2010/050037
§ 371 (c)(1), (2), (4) Date: Aug. 18, 2011

(87) PCT Pub. No.: WO2010/079312
PCT Pub. Date: Jul. 15, 2010

(65) Prior Publication Data
US 2011/0295528 A1    Dec. 1, 2011

(30) Foreign Application Priority Data
Jan. 12, 2009    (FR) ..................................... 09 00109

(51) Int. Cl.
*G01F 17/00*    (2006.01)
(52) U.S. Cl.
CPC ..................................... *G01F 17/00* (2013.01)
USPC ......................................................... 702/51
(58) Field of Classification Search
USPC .................. 702/51, 64–6, 182–185
See application file for complete search history.

(56) References Cited

U.S. PATENT DOCUMENTS

| 5,115,667 | A | * | 5/1992 | Baret | ............................. 73/40.7 |
| 6,177,665 | B1 | | 1/2001 | Wolf | |
| 2006/0080045 | A1 | | 4/2006 | Steiner | |

FOREIGN PATENT DOCUMENTS

| EP | 0402827 A1 | 12/1990 |
| FR | 2711792 A1 | 5/1995 |

OTHER PUBLICATIONS

International Search Report PCT/FR2010/050037 dated Jun. 17, 2010.

*Primary Examiner* — Edward Raymond
(74) *Attorney, Agent, or Firm* — Sughrue Mion, PLLC

(57) ABSTRACT

The invention relates to a device for measuring and processing an input signal (To) of at least two decades, comprising: an electron multiplier (4) that has an exponential gain on the basis of the power supply voltage (Vm) thereof and which receives said input signal (To); a power supply (5) that provides the power supply voltage (Vm) of said multiplier (4); a control circuit (6) of the power supply (5), the gain (10) and shift (11) parameters of which are adjustable and define an output signal range while varying the exponential gain of said multiplier (4); a logarithmic compression amplifier (T), the output of which is received as an input of the control circuit (6) so as to vary the exponential gain of the electron multiplier (4), in a continuous manner over the dynamic range of a measurement, on the basis of the output signal (IoG) of the electron multiplier (4), and forming the output signal (Vout) of said device; a measuring and calculating means for predetermining the value of the exponent (b) for the exponential gain of the electron multiplier (4) and for calculating the gain (10) and shift (11) parameter values of said control circuit (6) on the basis of the value of said predetermined exponent (b). The invention also relates to a corresponding leak detector and measuring and processing method.

10 Claims, 3 Drawing Sheets

DEVICE FOR MEASURING AND PROCESSING A HIGH DYNAMIC INPUT SIGNAL, AND CORRESPONDING LEAK DETECTOR AND MEASURING AND PROCESSING METHOD

BACKGROUND OF THE INVENTION

The present invention relates to a device for measuring and processing an input signal of wide dynamic range, a leak detector and a corresponding measurement and processing method.

Electron multipliers are components which have an amplification function. Their gain is usually very high, possibly ranging up to $10^5$. They are used in wide-ranging applications in which very weak signals are processed. Among other applications worth citing, there are the measurement of light energy (photomultipliers) in the visible or invisible, image intensifiers, the measurement of nuclear radiation (ionization chambers), mass spectrometry and in particular helium leak detection.

In these applications, the signals to be processed in certain cases exhibit a dynamic range of the order of $10^8$. It is therefore necessary to have a measurement system which comprises the electron multiplier and a signal compressor amplifier. This element may not, on its own, adequately reduce the output dynamic range. It is then necessary to act on the gain of the electron multiplier to implement an additional compression. This is obtained by acting on its power supply voltage. In known devices, the gain of the measurement system, notably by action on said power supply voltage, is controlled discontinuously, either manually by the use of a switch or, in more sophisticated systems, by automatic electronic switching or by multiple measurement systems. This discontinuity in the transfer functions generates undesirable effects such as significant response times or instabilities when the signal is at the limit of two amplification ranges.

Already known from the document EP 0 402 827 is a device for processing the signal received by an electron multiplier, allowing for a continuous measurement of the signal over a wide dynamic range, comprising an electron multiplier receiving the input signal Io, a high-voltage power supply for the multiplier provided with a control circuit, a feedback loop including a compressor amplifier delivering the output signal and also acting on the control circuit so as to vary the gain of the electron multiplier continuously over the measurement dynamic range, as a function of the output signal IoG of the electron multiplier.

The device implemented in this way makes it possible to process an input signal with high dynamic range to obtain a usable linear output signal that can represent the input signal received by the electron multiplier over a wide band of the input signal extending up to eight decades.

The high voltage power supply determines the gain of the electron multiplier. This power supply is modulated by the control circuit receiving the output signal of the device. For this, the control circuit has adjustable gain and offset parameters which define the band of the output signal.

To adjust these gain and offset parameters, the conventional method consists in injecting two different input currents and in adjusting the corresponding gain and offset parameters for each value of the input current.

However, this adjustment does not take immediate effect. In practice, the gain and offset parameters of the control circuit are interdependent and mutually influential. In other words, the adjustment of the gain parameter of the control circuit leads to the modification of both the offset and of the gain of the band of the output signal. Similarly, the successive adjustment of the offset parameter of the control circuit leads to the modification of both the offset and the gain of the band of the output signal. The interdependence of these two parameters demands a fine adjustment of the parameters of the control circuit, requiring a certain number of iterations to achieve the desired output signal band. This adjustment may take a relatively long time, given that several minutes may be needed to obtain a satisfactory stabilization of the output signal IoG after each modification of the injected input current Io.

SUMMARY OF THE INVENTION

The aim of the present invention is therefore to propose a device for measuring and processing an input signal of wide dynamic range, a leak detector and a corresponding measurement and processing method, which do not exhibit these drawbacks.

To this end, the subject of the invention is a device for measuring and processing an input signal of at least two decades, comprising:
- an electron multiplier having an exponential gain as a function of its power supply voltage and receiving said input signal,
- a power supply providing the power supply voltage for said multiplier,
- a control circuit for the power supply, whose gain and offset parameters are adjustable and define a band for the output signal by varying the exponential gain of said multiplier,
- a logarithmic compressor amplifier whose output is, on the one hand, received as input for the control circuit to vary the exponential gain of the electron multiplier continuously over the measurement dynamic range, according to the output signal of the electron multiplier, and forming, on the other hand, the output signal of said device, characterized in that it also comprises measurement and calculation means for determining the value of the exponent of the exponential gain of the electron multiplier and for calculating the values of the gain and offset parameters of said control circuit based on the value of said determined exponent.

The determination of the exponent of the gain of the electron multiplier prior to the determination of the theoretical gain and offset parameter values of the control circuit makes it possible to accurately determine the latter without needing to perform numerous iterative measurements.

According to other features of the measurement and processing device,
- said measurement and calculation means are suitable for varying the power supply voltage and for measuring a signal representative of the output signal of the corresponding electron multiplier for each power supply voltage, in order to calculate the value of the exponent of the exponential gain of the electron multiplier based on the measured values,
- the measurement and calculation means are suitable for measuring a signal representative of the output signal of the electron multiplier and the output signal of the power supply, according to two predetermined input signals applied to the input of the electron multiplier, in order to calculate the values of the gain and offset parameters of the control circuit to be applied, based on the values of the measured signals and on the value of said determined exponent, the logarithmic compressor amplifier comprises an amplifier and a logarithmic compressor, the output of said amplifier being received as input for said logarithmic compressor, and the measurement and calculation means are suitable for measuring output signals of the amplifier of the logarithmic compressor in order to determine a signal representative of the output signal of the electron multiplier, said device comprises drivable means for applying at least one predetermined input signal and a processing unit for driving said measurement and calculation means and said drivable means automatically and for implementing said logarithmic compressor and the control circuit by a computer program, the device comprises a calibrated gas injection means linked to a solenoid valve of said drivable means.

The subject of the invention is also a leak detector comprising ionization means for ionizing an incident gas flow, a mass spectrometer for deflecting the ionized gas flow, characterized in that it comprises a device for measuring and processing an input signal of wide dynamic range as described previously, the input of the electron multiplier being linked to the output of the mass spectrometer.

Yet another subject of the invention is a method for measuring and processing an input signal implemented in a device for measuring and processing an input signal of at least two decades as described previously, characterized in that the value of the exponent of the exponential gain of the electron multiplier is determined in order to calculate the valves of the gain and offset parameters of said control circuit based on the value of said determined exponent.

According to other features of the measurement and processing method, in order to determine the value of the exponent of the exponential gain of said electron multiplier,
  a predetermined current is applied to the input of the electron multiplier,
  the power supply voltage of said multiplier is varied, and,
  the output voltage of the amplifier of the logarithmic compressor representative of the output signal of said multiplier is measured,
so as to determine the slope of a linear relationship between the output voltage of the amplifier and the power supply voltage, corresponding to the value of the exponent of the exponential gain of said electron multiplier, a signal representative of the output signal of the electron multiplier and the output signal of the power supply, as a function of two predetermined input signals applied to the input of the electron multiplier are measured, in order to calculate the values of the gain and offset parameters of the control circuit to be applied, based on the values of the measured signals and on the value of said determined exponent.

BRIEF DESCRIPTION OF THE DRAWINGS

Other advantages and features will become apparent from reading the description of the invention, and the appended drawings in which.

In these figures, identical elements are given the same reference numbers.

DETAILED DESCRIPTION OF THE INVENTION

Figure 1:
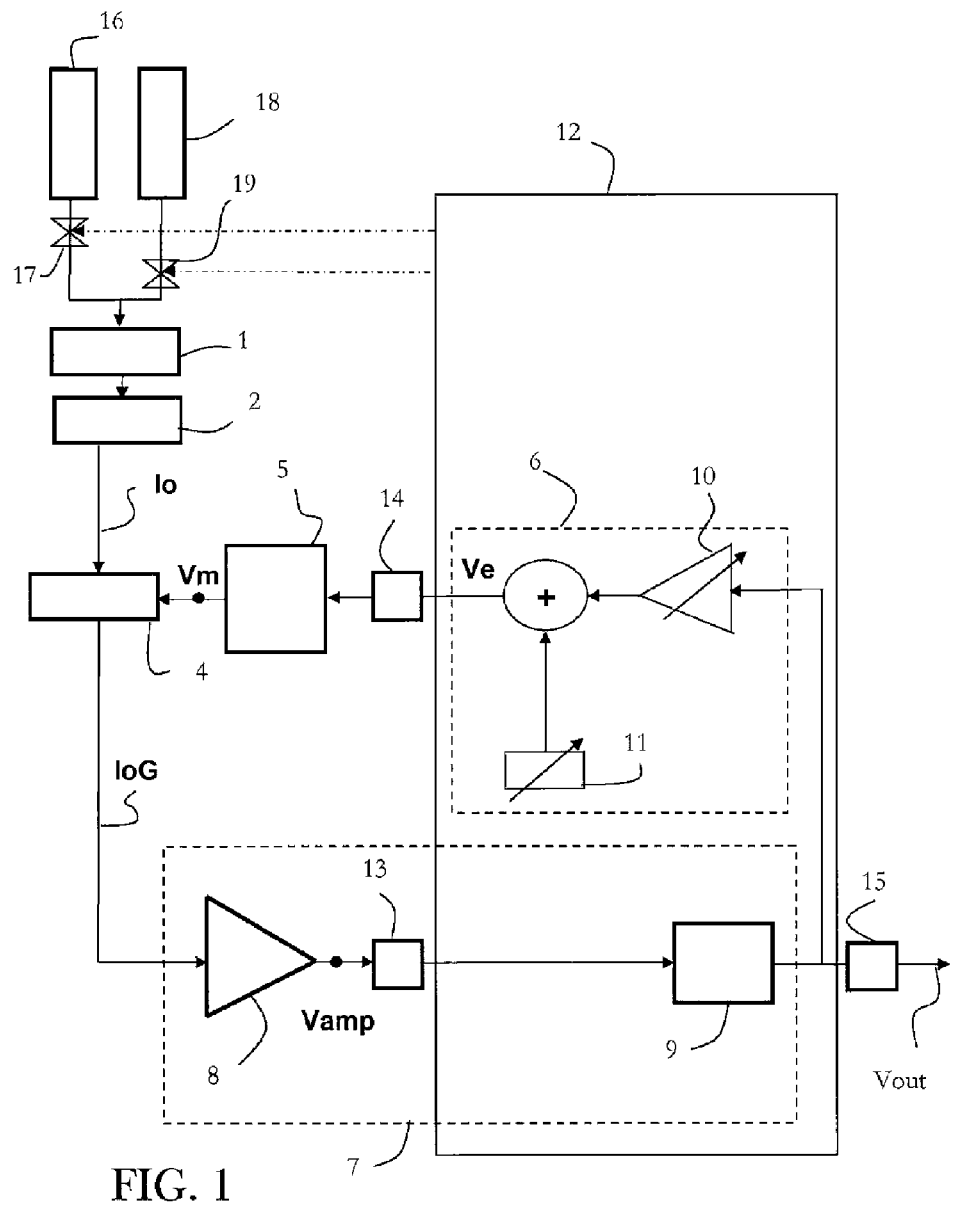
FIG. 1 represents a diagram of a measurement and processing device.

FIG. 1 represents a device for measuring and processing an input signal Io of at least two decades, that is to say, of wide dynamic range.

The measurement and processing device is notably applicable in a particular field of mass spectrometry which relates to the detection of leaks in helium. The aim is to measure the partial pressure of helium contained in the residual atmosphere of a chamber for which the seal-tightness is to be checked. Two cases commonly arise. If the chamber has a large volume, a pump is used to create the vacuum therein, an atmosphere surrounding this chamber that is enriched with helium, the reference gas, is created, and the pumped gas is analyzed by checking whether it is also enriched with helium. If the chamber is small, a case for example, the first step is to subject this case to excess helium pressure in a chamber, then it is placed in a second chamber where the vacuum is created. The pumped gas is analyzed in the same way to check whether it is enriched with helium.

For this, a leak detector is used that includes ionization means 1 for ionizing the incident gas flow, a mass spectrometer 2 for deflecting the ionized gas flow, and the measurement and processing device.

The mass spectrometer 2 comprises a filter, the aim of which is to spatially deflect the molecules of gas previously ionized by the ionization means 1 according to their ratio m/q, in which m is the mass of the molecule and q its charge.

In the example considered, the spectrometer 2 is calibrated on the helium spike. At the output of this spatial filter, the incident helium ions are converted into electrons and then multiplied to create an electron current IoG which will be processed to obtain an output signal of the device Vout.

The device comprises an electron multiplier 4 having a gain that varies exponentially as a function of its power supply voltage Vm and receiving the input signal Io, a high-voltage power supply 5 supplying the power supply voltage Vm to the multiplier 4, a control circuit 6 for the power supply 5, defining a band for the output signal of the device by varying the exponential gain of the multiplier 4, and a logarithmic compressor amplifier 7.

The output of the logarithmic compressor amplifier 7 is, on the one hand, received as input for the control circuit 6 to vary the exponential gain of the electron multiplier 4 continuously over the measurement dynamic range, as a function of the output signal IoG of the electron multiplier 4, and forms, on the other hand, the output signal of the device Vout.

Figure 2:
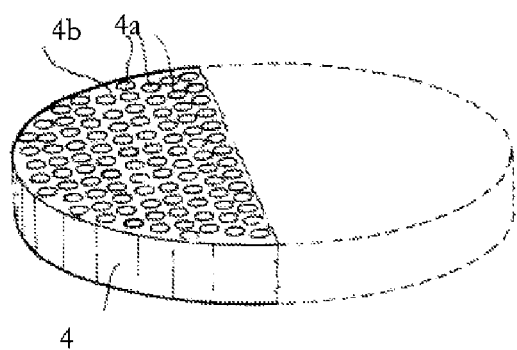
FIG. 2 represents an electron multiplier of the "microchannel wafer" type.
Figure 3:
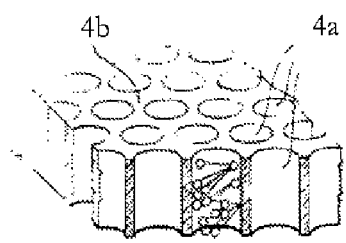
FIG. 3 is a partial cross-sectional view of the microchannel wafer of FIG. 2, and, FIG. 4 is a graph representing an example of an output signal of the measurement and processing device as a function of a corresponding input signal on a logarithmic scale.

The electron multiplier 4 is, for example, a microchannel wafer represented in FIGS. 2 and 3. The microchannel wafer transforms a stream of particles originating from the mass spectrometer 2 into a stream of incident electrons and acts on this stream of incident electrons as an electron multiplier.

The microchannel wafer comprises a multitude of microchannels 4a arranged approximately in the axis of the incident stream. Each microchannel 4a is an individual electron multiplier. The microchannel 4a is covered with a layer with high resistivity whose secondary emission coefficient is greater than unity.

Thus, an incident electron, by successive shocks and progression in the microchannel 4a, generates at the output of the wafer a large number of electrons. This number of electrons corresponds to a gain.

The set of the microchannels 4a is electrically connected by the coating of a metallic layer 4b on each of the two planar faces of the wafer. The power supply voltage Vm from the high-voltage power supply 5 is applied between its two faces. The power supply voltage Vm is generally between 400 and 1500 volts. It is this which determines the gain of the electron multiplier. The power supply voltage Vm is, for example, proportional to the signal Ve applied to the input of the power supply 5, obtained from the control circuit 6 (relationship (1))

$$Vm = KVm * Ve (KVm: \text{constant proportional factor}) \quad (1)$$

The gain of the microchannel wafer, of the order of $10^4$ to $10^5$, is an exponential function of the power supply voltage Vm which is applied to it.

According to a first embodiment, the exponential gain of the multiplier 4 corresponds to $a*Vm^b$ in which a corresponds to a multiplying factor and b corresponds to the exponent of the exponential gain. The exponential gain is therefore proportional to the product of the power supply voltage Vm by itself b times.

The electron multiplier 4 receiving the stream of particles may be followed by an electron collector (not represented) which produces an electronic current IoG, according to the relationship (2).

$$IoG = a*Vm^b*Io \quad (2)$$

This current IoG is injected into the compressor amplifier 7 which amplifies the signal IoG and performs a compression thereof so as to reduce its dynamic range. The output signal Vout of this compressor amplifier 7 can then be utilized. The device includes, for example, means for displaying the output signal in order to display the output signal Vout.

As represented in FIG. 1, the logarithmic compressor amplifier 7 comprises an amplifier 8 and a logarithmic compressor 9. The output Vamp of the amplifier 8 is received as input for the logarithmic compressor 9 and corresponds to the electronic current IoG amplified by a constant gain Kamp, according to the relationship (3) deriving from the relationship (2):

$$Vamp = Kamp*a*Vm^b*Io \quad (3)$$

The logarithmic compressor 9 applies a compression function to the output Vamp, so that the output signal Vout corresponds to Log(Vamp) (relationship (4)).

$$Vout = Log(Vamp) \quad (4)$$

The high-voltage power supply 5 of the electron multiplier 4 is modulated by the control circuit 6 receiving the output signal Vout. Thus, the power supply voltage Vm is maximal when the electronic current IoG is minimal or zero, and minimal when the electronic current IoG is maximal. The result of this is an additional compression of the dynamic range of the measurement system.

The compressor amplifier 7 being a logarithmic amplifier, the control circuit 6 for the power supply 5 of the multiplier 4 is a linear amplifier such that the high voltage Vm produced by the power supply 5 is a linear function of the output signal Vout. In order to define the band of the output signal of the device, the linear amplification control circuit 6 has a gain parameter 10 and an offset parameter 11 that are adjustable. The relationship (5) applies.

$$Ve = \text{gain parameter}*Vout + \text{offset parameter} \quad (5)$$

For example, the control circuit 6 and the compressor amplifier 7 are analog electronic circuits and the gain and offset 11 parameters can be adjusted by potentiometers. The amplifier 8 is, for example, an operational amplifier.

It is also possible to provide for the logarithmic compressor 9 and the control circuit 6 to be implemented by a computer program implemented in a processing unit 12 including a microprocessor.

The device then includes an analog/digital converter 13 at the output of the amplifier 8 and at the input of the compressor 9, a digital/analog converter 14 at the input of the power supply 5 to produce the analog signal Ve and a digital/analog converter 15 at the output Vout of the device.

Figure 4:
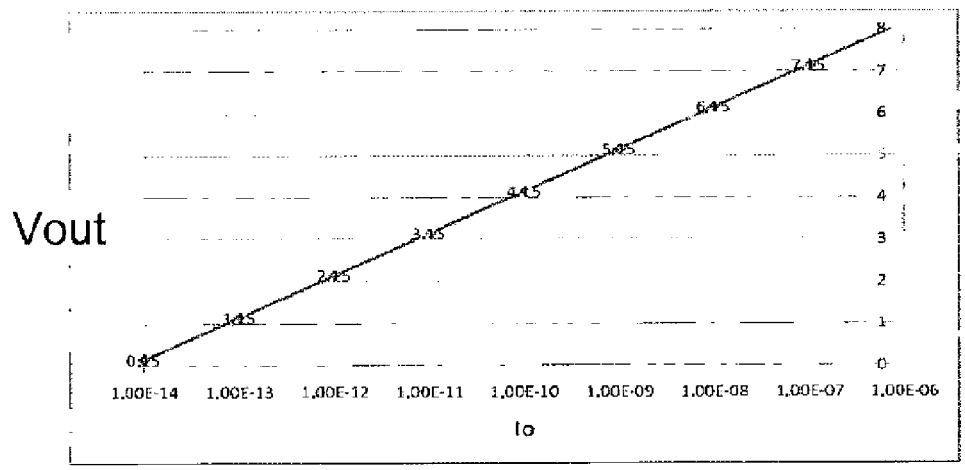

FIG. 4 represents an example of the output signal Vout of a signal processing device for a leak detector, as a function of the corresponding input signal Io on a logarithmic scale x axis according to the first embodiment. The relationship between the output signal Vout and the logarithm of the input current Io is linear.

The processing device thus makes it possible to convert an incident stream of helium ions having a dynamic range of $10^8$ (varying approximately between $10^{-14}$ and $10^{-6}$ amperes) into an electronic current IoG and to amplify this electronic current to produce an output signal Vout for which the band of the output signal is between 0 and 8 V.

Thus, the device makes it possible to process an input signal with a high dynamic range to obtain a linear output signal Vout that can be utilized, making it possible to represent the input signal received by the electron multiplier 4 over a wide band of an input signal of eight decades.

The device also comprises measurement and calculation means for determining the value of the exponent b of the exponential gain of the electron multiplier 4 and for calculating the values of the gain 10 and offset 11 parameters of the control circuit 6 based on the determined exponent value b.

For example, the measurement and calculation means are suitable for varying the power supply voltage Vm and for measuring a signal representative of the output signal IoG of the corresponding electron multiplier 4 for each power supply voltage Vm, in order to calculate the value of the exponent b of the exponential gain of the electron multiplier 4 based on the measured values.

To facilitate the measurement, provision is made for the measurement and calculation means to be able to measure output signals Vamp of the amplifier 8 representative of the output signal IoG of the electron multiplier 4.

The device may also comprise drivable means for applying the predetermined input signal Io and varying the power supply voltage Vm, so that the processing unit 12 can drive the measurement and calculation means and the drivable means automatically.

For example, the device comprises at least one calibrated gas injection means 16 linked to a solenoid valve 17 of the drivable means. Thus, the drivable means can control the opening of the solenoid valve 17 downstream of the calibrated gas injection means 16. The gas flow is then directed toward the ionization means 1 and the mass spectrometer 2, to apply a predetermined incident stream Io of ions to the electron multiplier 4.

It is also possible to provide for the measurement and calculation means to be capable of measuring a signal representative of the output signal of the electron multiplier, such as the output signal of the amplifier Vamp1, Vamp2, and the output signal of the power supply Vm1, Vm2, according to two predetermined input signals IoPF, IoGF applied to the input of the electron multiplier 4. Based on the values of the measured signals and on the determined exponent value b, the measurement and calculation means can calculate the values of the gain 10 and offset 11 parameters of the control circuit 6 to be applied.

For example, the device comprises means that can be driven by the processing unit 12 to apply two predetermined input signals IoPF, IoGF automatically.

The first predetermined input signal IoPF corresponds, for example, to a small calibrated injection of gas and the second predetermined input signal IoGF corresponds to a larger calibrated injection of gas, such as at least about one hundred times greater than the small injection.

As described previously, the device may thus comprise two calibrated gas injection means 16, 18, linked to respective solenoid valves 17, 19 of the drivable means.

In operation, the method for measuring and processing an input signal of wide dynamic range implemented in the device for measuring and processing an input signal of wide dynamic range comprises the following steps.

The value of the exponent b of the exponential gain of the electron multiplier 4 is determined in order to calculate the values of the gain 10 and offset 11 parameters of the control circuit 6 based on the determined exponent value b.

The determination of the exponent b of the gain of the electron multiplier 4 prior to the determination of the theoretical gain 10 and offset 11 parameter values of the control circuit 6 makes it possible to accurately determine the latter without having to perform numerous iterative measurements.

For example, in order to determine the value of the exponent b of the exponential gain of the electron multiplier 4, the first step is to apply a predetermined current Io to the input of the electron multiplier 4.

Then, the power supply voltage Vm of the multiplier 4 is varied, for example by modifying the set point of Ve in the computer program implementing the control circuit 6 and the output voltage of the amplifier of the logarithmic compressor Vamp representative of the output signal IoG of the multiplier 4 is measured.

The relationship (6) is deduced from the relationship (3), such that the slope of the linear relationship between the logarithm of the output voltage of the amplifier Vamp and the logarithm of the power supply voltage corresponds to the value of the exponent b of the exponential gain of the electron multiplier 4.

$$\text{Log}(Vamp) = \text{Log}(Kamp) + \text{Log}(Io) + \text{Log}(a) + b*\text{Log}(Vm) \quad (6):$$

The slope of the linear relationship between Log(Vamp) and Log(Vm), corresponding to the value of the exponent b of the exponential gain of the electron multiplier 4, is then determined.

Instead of measuring the output Vm of the power supply 5, it is possible to use the known input Ve of the power supply 5, since the output Vm of the power supply 5 is proportional to the input Ve of the power supply 5 (relationship (1)). The slope of the linear relationship Log(Vamp) as a function of Log(Ve) corresponds to the value of the exponent b of the exponential gain of the electron multiplier 4. However, the measurement of the output voltage Vm of the power supply 5 makes it possible to determine the value of the exponent b of the exponential gain of the electron multiplier 4 more accurately.

Knowing the value of the exponent b of the exponential gain of the electron multiplier 4, the method may include a successive step in which the values of the gain 10 and offset 11 parameters of the control circuit 6 are determined theoretically.

For this, a first predetermined current IoGF, corresponding, for example, to a signal of a large calibrated gas injection, is applied to the input of the electron multiplier 4.

VampGF is used to designate the output signal of the amplifier 8, VmGF the output signal of the power supply 5 and VoutGF the output signal of the device, with the predetermined current IoGF and the theoretical gain and offset parameters to obtain the desired VoutGF signal. Vamp0 is used to designate the initial output signal of the amplifier 8 and Vm0 the output signal of the power supply 5, with the predetermined current IoPF and the initial gain and offset parameters.

The output signal of the electron multiplier Vamp0 and the output signal of the power supply Vm0 are measured. The two measurement points are represented by dots in FIG. 1.

From the relationship (3) applied for VampGF and Vamp0, the relationship (7) is deduced.

$$VeGF = (VampGF/Vamp0)^{1/b} * Ve0 \quad (7):$$

Furthermore, VampGF can be deduced from the relationship (4).

Therefore, knowing Vm0 (and therefore Ve0 according to the relationship (1)), Vamp0, b and desired VoutGF, it is possible to determine VeGF.

Then, a second predetermined current IoPF, corresponding, for example, to a signal of a smaller calibrated gas injection, is applied to the input of the electron multiplier 4.

VoutPF is used to designate the output signal of the device desired with the predetermined current IoPF and the theoretical gain and offset parameters. Vamp1 is used to designate the output signal of the amplifier 8 and Vm1 the output signal of the power supply 5, with the predetermined current IoPF and the initial gain and offset parameters.

By applying the same reasoning as previously for the first predetermined current IoGF, it is possible to determine VePF knowing Vm1, Vamp1, b and desired VoutPF.

Then, the theoretical values of the gain 10 and offset parameters to be applied are calculated, based on the values of the desired signals VoutGF, VoutPF, the calculated values VeGF and VePF and the determined value of the exponent b of the exponential gain.

In practice, an effort is made to calculate the gain 10 and offset 11 parameters of the control circuit 6 for the two currents IoGF and IoPF. Now, it is possible to calculate the gain and offset parameters according to the relationship (5) applied to VeGF and VePF, since VeGF and VePF have been determined.

According to a second embodiment, the exponential gain of the multiplier 4 corresponds to A*exp(B*Vm) in which A corresponds to a multiplying factor and B corresponds to the exponent of the exponential gain. The exponential gain is therefore proportional to the exponential function base e of the product of the power supply voltage Vm by the exponent B.

The relationship (2) becomes (2').

$$IoG = A * \exp(B * Vm) * Io \quad (2'):$$

The relationships (3') and (4') are then obtained:

$$Vamp = Kamp * A * \exp(B * Vm) * Io \quad (3'):$$

$$Vout = \ln(Vamp) \text{ (ln being the neperian logarithm)} \quad (4'):$$

The relationship (6') is deduced from the relationship (3').

$$\ln(Vamp) = \ln(Kamp * A * Io) + B * Vm \quad (6'):$$

The slope of the linear relationship between ln(Vamp) and Vm, corresponding to the value of the exponent B of the exponential gain of the electron multiplier 4, is then determined.

Knowing the value of the exponent B of the exponential gain of the electron multiplier 4, the values of the gain 10 and offset 11 parameters of the control circuit 6 are determined theoretically.

In practice, based on the relationship (3') applied for VampGE and Vamp0, it is possible to determine VeGF from the relationship (7') for a first predetermined current IoGF.

$$VeGF = 1/(B*KVm)*\ln(VampGF/Vamp0) + Ve0 \quad (7'):$$

Then, a second predetermined current IoPF is applied, to determine VePF in the same way.

Next, the theoretical values of the gain 10 and offset 11 parameters to be applied are calculated, based on the values of the desired signals VoutGF, VoutPF, the calculated values VeGF and VePF and the determined value of the exponent B of the exponential gain.

Consequently, the determination of the exponent b,$\overline{B}$ of the exponential gain of the electron multiplier 4 prior to the determination of the theoretical gain 10 and offset 11 parameter values of the control circuit 6 makes it possible to accurately determine the latter without having to perform numerous iterative measurements.

The invention claimed is:

1. A device for measuring and processing an input signal (Io) of at least two decades, comprising:
    an electron multiplier (4) having an exponential gain as a function of its power supply voltage (Vm) and receiving said input signal (Io),
    a power supply (5) providing the power supply voltage (Vm) for said multiplier (4),
    a control circuit (6) for the power supply (5), whose gain (10) and offset (11) parameters are adjustable and define a band for the output signal by varying the exponential gain of said multiplier (4),
    a logarithmic compressor amplifier (7) whose output is, on the one hand, received as input for the control circuit (6) to vary the exponential gain of the electron multiplier (4) continuously over the measurement dynamic range, according to the output signal (IoG) of the electron multiplier (4), and forming, on the other hand, the output signal (Vout) of said device,
    measurement and calculation means for determining the value of the exponent (b, B) of the exponential gain of the electron multiplier (4) and for calculating the values of the gain (10) and offset (11) parameters of said control circuit (6) based on the value of said determined exponent (b, B).

2. The measuring and processing device as claimed in claim 1, in which the measurement and calculation means are suitable for varying the power supply voltage (Vm) and for measuring a signal representative of the output signal (IoG) of the corresponding electron multiplier (4) for each power supply voltage (Vm), in order to calculate the value of the exponent (b, B) of the exponential gain of the electron multiplier (4) based on the measured values.

3. The measurement and processing device as claimed in claim 1, in which the measurement and calculation means are suitable for measuring a signal representative of the output signal of the electron multiplier (Vamp1, Vamp2) and the output signal of the power supply (Vm1, Vm2), according to two predetermined input signals (IoPF, IoGF) applied to the input of the electron multiplier (4), in order to calculate the values of the gain (10) and offset (11) parameters of the control circuit (6) to be applied, based on the values of the measured signals and on the value of said determined exponent (b, B).

4. The measurement and processing device as claimed in claim 1, whose logarithmic compressor amplifier (7) comprises an amplifier (8) and a logarithmic compressor (9), the output (Vamp) of said amplifier (8) being received as input for said logarithmic compressor (9), wherein the measurement and calculation means are suitable for measuring output signals of the amplifier of the logarithmic compressor (Vamp1, Vamp2) in order to determine a signal representative of the output signal (IoG) of the electron multiplier (4).

5. The measurement and processing device as claimed in claim 1, comprising drivable means for applying at least one predetermined input signal (Io) and a processing unit (12) for driving said measurement and calculation means and said drivable means automatically and for implementing said logarithmic compressor (9) and the control circuit (6) by a computer program.

6. The measurement and processing device as claimed in claim 5, comprising a calibrated gas injection means (16, 18) linked to a solenoid valve (17, 19) of the drivable means.

7. A leak detector comprising ionization means (1) for ionizing an incident gas flow, a mass spectrometer (2) for deflecting the ionized gas flow, and comprising a device for measuring and processing an input signal of wide dynamic range as claimed in claim 1, the input of the electron multiplier (4) being linked to the output of the mass spectrometer (2).

8. A method for measuring and processing an input signal implemented in a device for measuring and processing an input signal (Io) of at least two decades as claimed in claim 1, wherein the value of the exponent (b, B) of the exponential gain of the electron multiplier (4) is determined in order to calculate the values of the gain (10) and offset (11) parameters of said control circuit (6) based on the value of said determined exponent (b, B).

9. The measurement and processing method as claimed in claim 8, in which, in order to determine the value of the exponent (b, B) of the exponential gain of said electron multiplier (4),
    a predetermined current (Io) is applied to the input of the electron multiplier (4),
    the power supply voltage (Vm) of said multiplier (4) is varied, and,
    the output voltage of the amplifier of the logarithmic compressor (Vamp) representative of the output signal (IoG) of said multiplier 4 is measured,
    so as to determine the slope of a linear relationship between the output voltage of the amplifier (Vamp) and the power supply voltage (Vm), corresponding to the value of said exponent (b, B) of the exponential gain of said electron multiplier (4).

10. The measurement and processing method as claimed in claim 8, in which a signal representative of the output signal of the electron multiplier (Vamp1, Vamp2) and the output signal of the power supply (Vm1, Vm2), as a function of two predetermined input signals (IoPF, IoGF) applied to the input of the electron multiplier (4), are measured, in order to calculate the values of the gain (10) and offset (11) parameters of the control circuit (6) to be applied, based on the values of the measured signals and on the value of said determined exponent (b, B).

* * * * *